United States Patent
Huang et al.

(10) Patent No.: US 12,001,937 B2
(45) Date of Patent: Jun. 4, 2024

(54) OPTICAL NEURAL NETWORK, DATA PROCESSING METHOD AND APPARATUS BASED ON SAME, AND STORAGE MEDIUM

(71) Applicant: INSPUR SUZHOU INTELLIGENT TECHNOLOGY CO., LTD., Jiangsu (CN)

(72) Inventors: Ping Huang, Jiangsu (CN); Ruizhen Wu, Jiangsu (CN); Jingjing Chen, Jiangsu (CN); Lin Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/268,665

(22) PCT Filed: Oct. 29, 2021

(86) PCT No.: PCT/CN2021/127513
§ 371 (c)(1),
(2) Date: Jun. 21, 2023

(87) PCT Pub. No.: WO2023/284168
PCT Pub. Date: Jan. 19, 2023

(65) Prior Publication Data
US 2024/0062038 A1 Feb. 22, 2024

(30) Foreign Application Priority Data
Jul. 15, 2021 (CN) .......................... 202110798164.3

(51) Int. Cl.
*G06N 3/04* (2023.01)
(52) U.S. Cl.
CPC ...................................... *G06N 3/04* (2013.01)
(58) Field of Classification Search
None
See application file for complete search history.

(56) References Cited

U.S. PATENT DOCUMENTS

| 2019/0190708 A1 | 6/2019 | Sibson |
| 2021/0090275 A1 | 3/2021 | Hogaboam et al. |

(Continued)

FOREIGN PATENT DOCUMENTS

| CN | 109477938 A | 3/2019 |
| CN | 110197277 A | 9/2019 |

(Continued)

OTHER PUBLICATIONS

Liu et al ("Research progress in optical neural networks: theory, applications and developments" Apr. 2021) (Year: 2021).*

(Continued)

*Primary Examiner* — Lut Wong
(74) *Attorney, Agent, or Firm* — Cooper Legal Group LLC

(57) ABSTRACT

Disclosed are a data processing method and apparatus based on an optical neural network, a computer-readable storage medium, and an optical neural network. The method includes: acquiring initial optical information and final output optical information as well as intermediate input optical information and intermediate output optical information at input/output ports of the phase shifter of an input optical signal in a case that beam-splitting ratios of the beam splitters of the two interference optical path structure satisfy a beam-splitting compensation condition; calculating parameters of the internal phase shifters of the two interference optical path structures in a case that the initial optical information and the intermediate input optical information as well as the intermediate output optical information and the final output optical information satisfy a preset beam-splitting condition of the optical neural network; and performing data processing by using the optical neural network based on the parameters.

20 Claims, 3 Drawing Sheets

---

Respectively acquire initial optical information, intermediate input optical information at an input port of the phase shifter, intermediate output optical information at an output port of the phase shifter, and final output information of an input optical signal — S201

Calculate parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network, so as to perform data processing by using the optical neural network based on the parameters — S202

(56) References Cited

U.S. PATENT DOCUMENTS

2021/0132650 A1* 5/2021 Lin .................. G06N 3/0675
2021/0201126 A1* 7/2021 Meng .................. G02F 3/00

FOREIGN PATENT DOCUMENTS

| CN | 111860822 A | 10/2020 |
| CN | 112629662 A | 4/2021 |
| CN | 113408720 A | 9/2021 |

OTHER PUBLICATIONS

Corresponding International Patent Application No. PCT/CN2021/127513, International Search Report, dated Apr. 13, 2022.
Corresponding International Patent Application No. PCT/CN2021/127513, Written Opinion, dated Apr. 13, 2022.

* cited by examiner

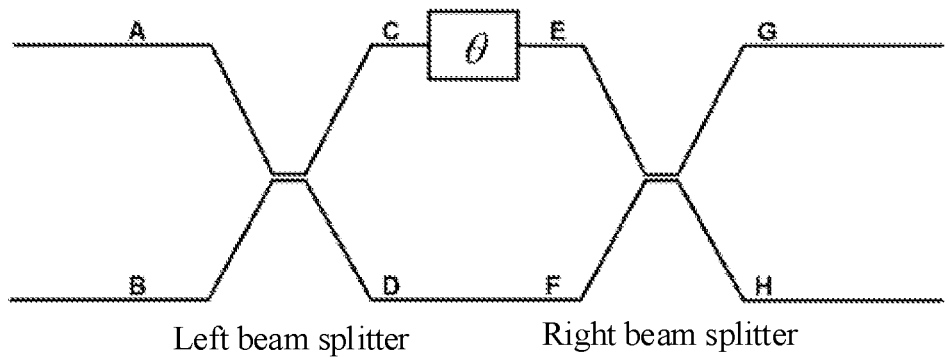
FIG. 1 -- Prior Art --
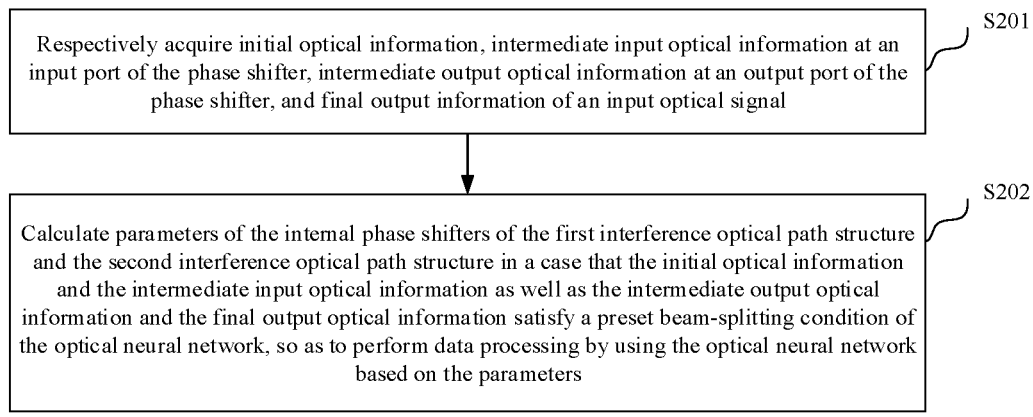
FIG. 2
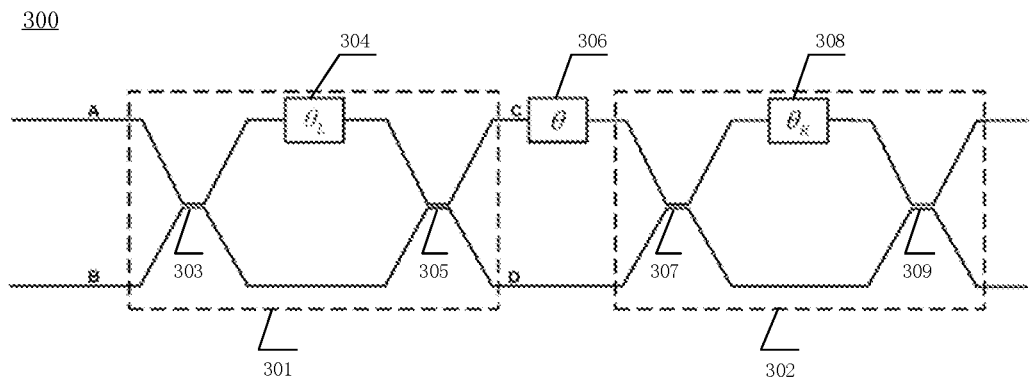
FIG. 3

OPTICAL NEURAL NETWORK, DATA PROCESSING METHOD AND APPARATUS BASED ON SAME, AND STORAGE MEDIUM

This application is the national phase application of International Application No. PCT/CN2021/127513, filed Oct. 29, 2021, which claims priority to Chinese Patent Application No. 202110798164.3, filed on Jul. 15, 2021 in China National Intellectual Property Administration and entitled "Optical Neural Network, Data Processing Method and Apparatus Based on Same, and Storage Medium". The contents of International Application No. PCT/CN2021/127513 and Chinese Patent Application No. 202110798164.3 are hereby incorporated by reference in their entireties.

FIELD

The present application relates to the field of computer technologies, and in particular, to a data processing method and apparatus based on an optical neural network, a computer-readable storage medium, and an optical neural network.

BACKGROUND

With the development of science and technology, today's society has entered the era of cloud+artificial intelligence (AI)+5th generation mobile communication technology (5G). In order to meet the computing requirements of cloud+AI+5G, a dedicated chip supporting a large amount of computation is required. A chip is one of the greatest inventions of mankind and the foundation and core of the modern electronic information industry. From mobile phones, computers, and digital cameras, to 5G, the Internet of Things, and cloud computing, are all based on continuous breakthroughs in chip technology. The development of photolithographic technology of semiconductors is the cornerstone of electronic computers with chips as the core. Currently, the photolithographic and manufacturing process of semiconductors almost reaches the physical limit of Moore's law. As the size of manufactured semiconductors gets smaller, a transistor unit in the chip is close to the molecular scale, and the "bottleneck effect" of the manufacturing process of semiconductors becomes more and more obvious. With the globalization and rapid development of science and technology, the volume of data that needs to be processed has increased sharply, and corresponding data processing models and algorithms have also been increased continuously. As a result, requirements for computing power and power consumption have increased continuously. Currently, electronic computers with the von Neumann architecture and the Harvard architecture have the problems of transmission bottleneck, increased power consumption, computing power bottleneck, and the like, which make the electronic computers difficult to meet the requirements for computing power and power consumption in the era of big data. For example, AI computing requirements do not match the computing power growth curve of the conventional chip. Therefore, how to increase the computing speed while reducing the computing power consumption is an urgent problem at present. Replacement of the conventional electronic computing method with the photon computing method will be one of potential solutions for the dilemma of Moore's law and the problem of the von Neumann architecture, that is, a solution for the current problems of computing power and power consumption. Photon has the characteristics of light speed propagation, anti-electromagnetic interference, arbitrary superposition, and the like. Compared with electronic computing, optical computing has many advantages. For example, an optical signal is transmitted at the speed of light, which greatly increases the computing speed. Optical computing has natural parallel processing capability, mature wavelength division multiplexing technology, extremely fast computing speed, and is very suitable for parallel computation, whereby greatly improving the data processing capability, volume, and bandwidth. The power consumption of optical computing is expected to be as low as 10-18 J/bit. Under the condition of same power consumption, a photonic device is hundreds of times faster than an electronic device, so integrated photonic chips with the deep learning capacity, high computing power, and low power consumption have been widely applied in, for example, a distance-measuring and speed-measuring high-resolution imaging lidar for remote high-speed moving targets, and a novel computational microscopy-associated imaging device for high-resolution nondestructive testing in an internal structure of a biomedical nanometer device.

In recent years, with the gradual failure of Moore's Law and the continuously improved requirements for power consumption and speed of a computing system in the era of big data, the characteristics of high speed and low power consumption of optical computing technology have attracted more and more attention. In addition, the characteristic of parallel computation of optical computing technology and the development of algorithms and hardware architectures such as an optical neural network provide the greatest potential solution for the requirements for computing power of AI technologies such as image recognition, speech recognition, and virtual reality. Optical computing may be divided into simulated optical computing and digital optical computing. The most typical example of simulated optical computing is Fourier computation. In fields of image processing and the like, it is necessary to use Fourier transform-related calculation, such as convolution calculation. It is a computationally intensive task for calculating Fourier transform with the conventional computer, and the process that light passes through a lens is a Fourier transform process, which takes almost no time. Digital optical computing combines light and an optical device into a typical logic gate to construct a computing system similar to the conventional digital electronic computer, and realizes computing through complex operation of a logic gate combination.

Photon computing of a Mach—Zehnder interferometer (MZI) is the most common industrial solution for optical neural networks today, and one of the study hot spots of optical neural networks (ONNs) is to realize optical linear operation based on an MZI. Many optical linear modules, such as matrix-vector multiplication and convolution, may be realized based on a topological structure of an MZI, and a beam-splitting ratio of a beam splitter used in typical topological structures, such as GridNet and FFTNet, is 50:50. However, an error will be introduced during manufacturing of a device, and a beam-splitting ratio of a beam splitter in an actual manufactured MZI is not exactly 50:50, and there is a great possibility that there is a deviation, which will severely affect the performance of an optical neural network based on the MZI, and affect the data processing accuracy.

In view of this, the current situation of poor performance of an optical neural network due to low beam-splitting accuracy of a beam splitter to improve the data processing accuracy is a technical problem that needs to be solved by those skilled in the art.

SUMMARY

The present application provides a data processing method and apparatus based on an optical neural network, a computer-readable storage medium, and an optical neural network. According to the present application, by compensating a beam splitter of an optical neural network, the technical problem of poor performance of an optical neural network due to low beam-splitting accuracy of a beam splitter is solved and the performance of the optical neural network is effectively improved, which in turn improves the data processing accuracy.

In order to solve the foregoing technical problem, embodiments of the present application provide the following technical solutions.

In an aspect, the embodiments of the present application provide a data processing method based on an optical neural network. An optical interference unit of the optical neural network includes a first interference optical path structure, a phase shifter, and a second interference optical path structure, and the first interference optical structure and the second interference optical path structure both include an internal phase shifter and a beam splitter. The method includes:

respectively acquiring initial optical information, intermediate input optical information at an input port of the phase shifter, intermediate output optical information at an output port of the phase shifter, and final output optical information of an input optical signal; and calculating parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network, so as to perform data processing by using the optical neural network based on the parameters.

In some embodiments, the input optical signal includes two paths of input optical signals, and the calculating parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network includes:

the first interference optical path structure including a first beam splitter, a first internal phase shifter, and a second beam splitter, inputting, by the first beam splitter, an input optical signal of the optical neural network into the first internal phase shifter, and inputting, by the second beam splitter, an optical signal outputted by the first internal phase shifter into the phase shifter; and invoking a first interference optical path optical parameter calculation relational expression to determine a parameter of the first internal phase shifter, the first interference optical path optical parameter calculation relational expression being as follows:

$$\begin{cases} L'_1 = (r_2 e^{i\theta_L} r_1 - t_2 t_1) L_1 + (r_2 e^{i\theta_L} i t_1 + i t_2 r_1) L_2 \\ L'_2 = (i t_2 e^{i\theta_L} r_1 + i r_2 t_1) L_1 + (r_2 r_1 - t_2 t_1 e^{i\theta_L}) L_2 \end{cases},$$

where, $L'_1$ is intermediate input optical information of a first input optical signal of the optical neural network at the input port of the phase shifter, $L'_2$ is intermediate input optical information of a second input optical signal of the optical neural network at the input port of the phase shifter, $L_1$ is initial optical information of the first input optical signal, $L_2$ is initial optical information of the second input optical signal, $r_1$ is the reflectance of the first beam splitter, $r_2$ is the reflectance of the second beam splitter, $t_1$ is an intermediate parameter and $t_1 = \sqrt{1-r_1^2}$, $t_2$ is an intermediate parameter and $t_2 = \sqrt{1-r_2^2}$, i represents an imaginary number, e represents an exponent, and $\theta_L$ is a parameter of the first internal phase shifter.

In some embodiments, the calculating parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network includes:

the preset beam-splitting condition being 50:50, solving the first interference optical path optical parameter calculation relational expression to obtain a first parameter calculation relational expression; and determining a parameter of the first internal phase shifter according to the first parameter calculation relational expression, the first parameter calculation relational expression being as follows:

$$\cos\theta_L = \frac{(t_2 t_1)^2 + (r_2 r_1)^2 - 1/2}{2 r_2 t_1 t_2 r_1}.$$

In some embodiments, the input optical signal includes two paths of input optical signals, and the calculating parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network includes:

the second interference optical path structure including a third beam splitter, a second internal phase shifter, and a fourth beam splitter, inputting, by the third beam splitter, an input optical signal of the phase shifter into the second internal phase shifter, and splitting and outputting, by the fourth beam splitter, an optical signal outputted by the second internal phase shifter; and invoking a second interference optical path optical parameter calculation relational expression to determine a parameter of the second internal phase shifter, the second interference optical path optical parameter calculation relational expression being as follows:

$$\begin{cases} L'_3 = (r_4 e^{i\theta_R} r_3 - t_4 t_3) L_3 + (r_4 e^{i\theta_R} i t_3 + i t_4 r_3) L_4 \\ L'_4 = (i t_4 e^{i\theta_R} r_3 + i r_4 t_3) L_3 + (r_4 r_3 - t_4 t_3 e^{i\theta_R}) L_4 \end{cases},$$

where, L'₃ is final output optical information of a first input optical signal, L'₄ is final output optical information of a second input optical signal, L₃ is intermediate output optical information of the first input optical signal at the output port of the phase shifter, L₄ is intermediate output optical information of the second input optical signal at the output port of the phase shifter, r₃ is the reflectance of the third beam splitter, r₄ is the reflectance of the fourth beam splitter, t₃ is an intermediate parameter and $t_3=\sqrt{1-r_3^2}$, t₄ is an intermediate parameter and $t_4=\sqrt{1-r_4^2}$, i represents an imaginary number, e represents an exponent, and $\theta_R$ is a parameter of the second internal phase shifter.

In some embodiments, the calculating parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network includes:

the preset beam-splitting condition being 50:50, solving the second interference optical path optical parameter calculation relational expression to obtain a second parameter calculation relational expression; and determining a parameter of the second internal phase shifter according to the second parameter calculation relational expression, the second parameter calculation relational expression being as follows:

$$\cos\theta_R = \frac{(t_3 t_4)^2 + (r_3 r_4)^2 - 1/2}{2 r_3 r_4 t_3 t_4}.$$

In some embodiments, before the respectively acquiring initial optical information, intermediate input optical information at an input port of the phase shifter, intermediate output optical information at an output port of the phase shifter, and final output optical information of an input optical signal, the method further includes:

respectively acquiring beam-splitting ratios of the beam splitters of the first interference optical path structure and the second interference optical path structure; and determining whether the beam-splitting ratios of the beam splitters satisfy a beam-splitting compensation condition, and performing the step of respectively acquiring initial optical information, intermediate input optical information at an input port of the phase shifter, intermediate output optical information at an output port of the phase shifter, and final output optical information of an input optical signal in a case that the beam-splitting ratios of the beam splitters satisfy the beam-splitting compensation condition.

In some embodiments, the preset beam-splitting condition is 50:50, and the determining whether the beam-splitting ratios of the beam splitters satisfy a beam-splitting compensation condition includes:

determining whether the beam-splitting ratios of the beam splitters are within a range of 15:85 to 85:15.

In another aspect, the embodiments of the present application provide a data processing apparatus based on an optical neural network. An optical interference unit of the optical neural network includes a first interference optical path structure, a phase shifter, and a second interference path structure, and the first interference optical path structure and the second interference optical path structure each includes an internal phase shifter and a beam splitter. The apparatus includes:

an optical information acquiring module, configured to respectively acquire initial optical information, intermediate input optical information at an input port of the phase shifter, intermediate output optical information at an output port of the phase shifter, and final output optical information of an input optical signal; and a calculation module, configured to calculate parameters of the internal phase shifters of the first interference optical path structure and the second interference optical path structure in a case that the initial optical information and the intermediate input optical information as well as the intermediate output optical information and the final output optical information satisfy a present beam-splitting condition of the optical neural network, so as to perform data processing by using the optical neural network based on the parameters.

The embodiments of the present application further provide a data processing apparatus based on an optical neural network, which includes a processor configured to execute a computer program stored in a memory to implement the steps in the data processing method based on an optical neural network according to any one of the foregoing aspects.

The embodiments of the present application further provide a computer-readable storage medium, which stores a data processing program based on an optical neural network that, when executed by a processor, implements the steps in the data processing method based on an optical neural network according to any one of the foregoing aspects.

The technical solutions of the present application have the following advantages: a beam splitter in a silicon photonic integrated circuit of an original optical neural network is replaced with two interference optical path structures, and the beam-splitting ratio of any beam splitter is compensated to a desired beam-splitting ratio by adjusting the parameters of the internal phase shifters of the first interference optical path structure and the second interference optical path structure, which solves the technical problem of poor performance of an optical neural network due to low beam-splitting accuracy of a beam splitter in the related technology, and effectively improves the performance of the optical neural network. The use of the optical neural network in which the beam splitters may be compensated for data processing enables various complex and accurate linear optical modules, which in turn improves the data processing accuracy.

In addition, the embodiments of the present application further provide the corresponding implementation apparatus, computer-readable storage medium, and optical neural network for the data processing method based on an optical neural network, which further make the method more practical. The apparatus, computer-readable storage medium, and optical neural network have the corresponding advantages.

It should be noted that the foregoing general description and the following detailed description are illustrative only, and are not intended to limit the present disclosure.

BRIEF DESCRIPTION OF THE DRAWINGS

In order to describe the technical solutions of the embodiments of the present application or the related art more clearly, drawings required to be used in the description of the embodiments or the related art will be briefly introduced below. Apparently, the drawings in the following description are only some embodiments of the present application. Those of ordinary skill in the art may obtain other drawings according to these drawings without involving any inventive work.

FIG. 1 is schematic structural diagram of a conventional optical neural network according to an embodiment of the present application;

FIG. 2 is a schematic flowchart of a data processing method based on an optical neural network according to an embodiment of the present application;

FIG. 3 is a schematic diagram of an optical path structure of an exemplary optical neural network according to an embodiment of the present application;

DETAILED DESCRIPTION

Figure 4:
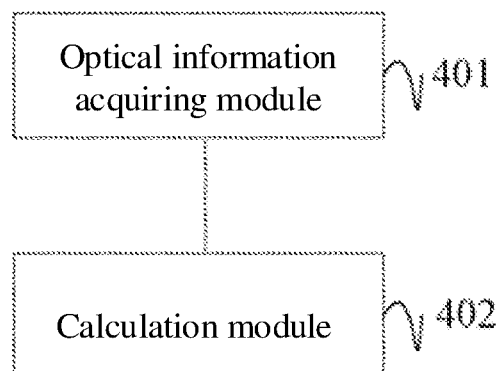
FIG. 4 is a structural diagram of a specific implementation mode of a data processing apparatus based on an optical neural network according to an embodiment of the present application.

In order to enable those skilled in the art to better understand the solutions of the present application, the present application will be further described in detail below with reference to the drawings and specific implementation modes. Apparently, the described embodiments are only some but not all of the embodiments of the present application. All other embodiments obtained by those of ordinary skill in the art based on the embodiments of the present application without involving any inventive effort shall fall within the scope of protection of the present application.

The terms "first", "second", "third", "fourth", and the like used in the description and the claims as well as the foregoing drawings of the present application are used for distinguishing different objects rather than describing a specific order. In addition, the terms "include", "have", and any variant thereof are intended to cover a non-exclusive inclusion. For example, a process, method, system, product or device including a series of steps or units is not limited to the listed steps or units, and may include unlisted steps or units.

After the technical solutions of the embodiments of the present application are introduced, various non-restrictive implementation modes of the present application will be described in detail below.

Referring to FIG. 2 first, FIG. 2 is a schematic flowchart of a data processing method based on an optical neural network according to an embodiment of the present application. A conventional optical interference unit is an optical structure shown in FIG. 1, which includes two beam splitters and a phase shifter. Input optical signals are processed by the left beam splitter, the phase shifter, and the right beam splitter in sequence and then outputted. Usually, a deviation will be introduced during manufacturing of the beam splitter, and in practice, the beam splitter does not process the input optical signal in strict accordance with a claimed beam-splitting ratio such as 50:50. However, the parameter is still adopted during calculation, which results in mismatching between a calculation result and an actual effect. Particularly, a larger deviation will cause poor performance of the optical neural network. In view of this, in order to solve the current problem, a deviation of a splitter of the present application may be compensated, so as to improve the network performance. In order to solve this problem, according to the present application, the optical structure of the optical neural network needs to be modified first. A structure of an optical neural network to which the embodiments of the present application are applied is that: an optical interference unit of a silicon photonic integrated circuit of the optical neural network includes a first interference optical path structure, a phase shifter, and a second interference optical path structure, and the first interference optical path structure and the second interference optical path structure each include an internal phase shifter and a beam splitter. The optical neural network may include multiple paths of input optical signals, such as two beams of input optical signals that, for ease of distinction, may be referred to as a first input optical signal and a second input optical signal. The input optical signals are processed by the first interference optical path structure, the phase shifter, and the second interference optical path structure in sequence and then outputted. For ease of distinction, the internal phase shifters of the first interference optical path structure and the second interference optical path structure may be referred to as a first internal phase shifter and a second internal phase shifter, and the beam splitters of the first interference optical path structure and the second interference optical path structure may be referred to as a first beam splitter, a second beam splitter, a third beam splitter, and a fourth beam splitter. Based on the foregoing specific optical structure of the optical neural network, a data processing process based on the optical neural network of this embodiment may include the following steps.

S201: Respectively acquiring initial optical information, intermediate input optical information at an input port of the phase shifter, intermediate output optical information at an output port of the phase shifter, and final output information of an input optical signal.

In this step, there may be a plurality of paths of input optical signals, and those skilled in the art may construct optical paths and determine the number of paths for input optical signals according to actual application conditions. The initial optical information is optical information carried by an optical signal of an input layer of the optical neural network, that is, information carried by an optical signal that is not processed by a component of the optical interference unit, and the optical information may be, for example, optical power. The intermediate input optical information is optical information carried by an optical signal outputted after the input optical signal is processed by the first interference optical path structure, and the intermediate output optical information is optical information carried by an optical signal outputted after the phase adjustment is performed on the optical signal corresponding to the intermediate input optical information by the phase shifter. The final output optical information is optical information carried by an optical signal outputted after the optical signal corresponding to the intermediate output optical information is processed by the second interference optical path structure.

S202: Calculating parameters of the internal phase shifters of the first interference optical path structure and the second interference optical path structure in a case that the initial optical information and the intermediate input optical information as well as the intermediate output optical information and the final output optical information satisfy a preset beam-splitting condition of the optical neural network, so as to perform data processing by using the optical neural network based on the parameters.

In this embodiment, an original beam-splitting component is replaced with two interference optical path structures, and a deviation of the beam splitter is compensated by adjusting the phase shifter of the interference optical path structure. Therefore, it is necessary to calculate the parameters of the phase shifters of the interference optical path structures. In a case that the parameters of the two phase shifters are exactly desired parameters, the initial optical information and the intermediate input optical information as well as the intermediate output optical information and the final output optical information satisfy the preset beam-splitting condition of the optical neural network, that is, the initial optical information and the intermediate input optical information satisfy the preset beam-splitting condition, and the intermediate output optical information and the final output optical information also satisfy the preset beam-splitting condition. The preset beam-splitting condition is a beam-splitting ratio that the original beam splitter intends to achieve. For example, a typical MZI structure is shown in FIG. 1, an MZI is composed of two beam splitters and a phase shifter, and in an ideal situation, beam-splitting ratios of the left beam splitter and the right beam splitter of the MZI are both 50:50. In this embodiment, the preset beam-splitting condition is 50:50. After the parameters of the internal phase shifters are determined, the two internal phase shifters of the optical neural network are adjusted according to the parameters, and then data is processed by using the optical neural network. In this way, the problem of inaccurate data processing result due to a deviation of the beam splitter is avoided, and the data processing accuracy is improved.

In the technical solutions of the embodiments of the present application, the beam splitter in the silicon photonic integrated circuit of the original optical neural network is replaced with two interference optical path structures, any beam splitter is compensated according to a desired beam-splitting ratio by adjusting the parameters of the internal phase shifters of the first interference optical path structure and the second interference optical path structure, so as to solve the technical problem of poor performance of an optical neural network due to low beam-splitting accuracy of a beam splitter in the related technology and effectively improve the performance of the optical neural network. The use of the optical neural network in which the beam splitter is compensated for data processing enables various complex and accurate linear optical modules, which in turn improves the data processing accuracy.

It should be noted that in the present application, the steps are not performed in a strict order, and may be performed simultaneously or in a preset order as long as these steps follow a logical order. FIG. 2 is merely exemplary, and does not mean that these steps are only performed in this order.

In the foregoing embodiments, a method for determining the parameters of the internal phase shifters of the optical neural network is not defined. In this embodiment, a method for calculating the parameters of the internal phase shifter is provided, which takes two paths of input optical signals as an example and may include the following steps:

the first interference optical structure includes a first beam splitter, a first internal phase shifter, and a second beam splitter, an input optical signal is inputted into the first internal phase shifter by the first beam splitter, an optical signal outputted by the first internal phase shifter is inputted into the phase shifter by the second beam splitter, the second interference optical path structure includes a third beam splitter, a second internal phase shifter, and a fourth beam splitter, an input optical signal of the phase shifter is inputted into the second internal phase shifter by the third beam splitter, and an optical signal outputted by the second internal phase shifter is split and outputted by the fourth beam splitter.

A first interference optical path optical parameter calculation relational expression is invoked to determine a parameter of the first internal phase shifter, and the first interference optical path optical parameter calculation relational expression is as follows:

$$\begin{cases} L'_1 = (r_2 e^{i\theta_L} r_1 - t_2 t_1)L_1 + (r_2 e^{i\theta_L} it_1 + it_2 r_1)L_2 \\ L'_2 = (it_2 e^{i\theta_L} r_1 + ir_2 t_1)L_1 + (r_2 r_1 - t_2 t_1 e^{i\theta_L})L_2 \end{cases},$$

where, $L'_1$ is intermediate input optical information of a first input optical signal of the optical neural network at the input port of the phase shifter, $L'_2$ is intermediate input optical information of a second input optical signal of the optical neural network at the input port of the phase shifter, $L_1$ is initial optical information of the first input optical signal, $L_2$ is initial optical information of the second input optical signal, $r_1$ is the reflectance of the first beam splitter, $r_2$ is the reflectance of the second beam splitter, $t_1$ is an intermediate parameter and $t_1 = \sqrt{1-r_1^2}$, $t_2$ is an intermediate parameter and $t_2 = \sqrt{1-r_2^2}$, i represents an imaginary number, e represents an exponent, and $\theta_L$ is a parameter of the first internal phase shifter.

A second interference optical path optical parameter calculation relational expression is invoked to determine a parameter of the second internal phase shifter, and the second interference optical path optical parameter calculation relational expression is as follows:

$$\begin{cases} L'_3 = (r_4 e^{i\theta_R} r_3 - t_4 t_3)L_3 + (r_4 e^{i\theta_R} it_3 + it_4 r_3)L_4 \\ L'_4 = (it_4 e^{i\theta_R} r_3 + ir_4 t_3)L_3 + (r_4 r_3 - t_4 t_3 e^{i\theta_R})L_4 \end{cases},$$

where, $L'_3$ is final output optical information of a first input optical signal, $L'_4$ is final output optical information of a second input optical signal, $L_3$ is intermediate output optical information of the first input optical signal at the output port of the phase shifter, $L_4$ is intermediate output optical information of the second input optical signal at the output port of the phase shifter, $r_3$ is the reflectance of the third beam splitter, $r_4$ is the reflectance of the fourth beam splitter, $t_3$ is an intermediate parameter and $t_3 = \sqrt{1-r_3^2}$, $t_4$ is an intermediate parameter and $t_4 = \sqrt{1-r_4^2}$, i represents an imaginary number, e represents an exponent, and $\theta_R$ is a parameter of the second internal phase shifter.

In order to enable those skilled in the art to clearly understand the implementation of the technical solutions of the present application, in the present application, a process of calculating the parameters of the internal phase shifters of the first interference optical path structure and the second interference optical path structure is described with reference to FIG. 3 by taking a situation where the preset beam-splitting condition is 50:50 as an example.

If the preset beam-splitting condition is 50:50, for the optical structure shown in FIG. 1, in an ideal situation, the beam-splitting ratios of the left beam splitter and the right beam splitter of the MZI are both 50:50, and the following is satisfied:

$$\frac{P_{A\to C}}{P_A} = \frac{1}{2}, \frac{P_{A\to D}}{P_A} = \frac{1}{2}, \frac{P_{B\to C}}{P_B} = \frac{1}{2}, \frac{P_{B\to D}}{P_B} = \frac{1}{2} \quad (1)$$

$$\frac{P_{E\to G}}{P_E} = \frac{1}{2}, \frac{P_{E\to H}}{P_E} = \frac{1}{2}, \frac{P_{F\to G}}{P_F} = \frac{1}{2}, \frac{P_{F\to H}}{P_F} = \frac{1}{2} \quad (2)$$

where, $P_A$ is power of A point, $P_B$ is power of B point, $P_E$ is power of E point, $P_F$ is power of F point, $P_{A\to C}$ represents power from A point to C point, $P_{A\to D}$ represents power from A point to D point, $P_{B\to C}$ represents power from B point to C point, $P_{B\to D}$ represents power from B point to D point, $P_{E\to G}$ represents power from E point to G point, $P_{F\to G}$ represents power from F point to G point, $P_{E\to H}$ represents power from E point to H point, and $P_{F\to H}$ represents power from F point to H point.

In this embodiment, the left beam splitter and the right beam splitter are respectively implemented based on the interference optical path structures. As shown in FIG. 3, there are four beam splitters BS1, BS2, BS3, and BS4 with corresponding reflectance $r_1$, $r_2$, $r_3$, and $r_4$, parameters of three phase shifters are $\theta_L$, $\theta$, and $\theta_R$, and the beam splitters are compensated by adjusting $\theta_L$ and $\theta_R$ to satisfy equations (1) and (2).

According to a transfer matrix of the MZI, a transfer matrix in a left dashed box in FIG. 3 may be obtained, which is as follows:

$$U_{MZI}(\theta_L; r_1, r_2) = U_{BS2}(r_2)U_{PS}(\theta_L)U_{BS1}(r_1) \quad (3)$$

$$= \begin{bmatrix} r_2 & it_2 \\ it_2 & r_2 \end{bmatrix} \begin{bmatrix} e^{i\theta_L} & 0 \\ 0 & 1 \end{bmatrix} \begin{bmatrix} r_1 & it_1 \\ it_1 & r_1 \end{bmatrix}$$

$$= \begin{bmatrix} r_2 e^{i\theta_L} & it_2 \\ it_2 e^{i\theta_L} & r_2 \end{bmatrix} \begin{bmatrix} r_1 & it_1 \\ it_1 & r_1 \end{bmatrix}$$

$$= \begin{bmatrix} r_2 e^{i\theta_L} r_1 - t_2 t_1 & r_2 e^{i\theta_L} it_1 + it_2 r_1 \\ it_2 e^{i\theta_L} r_1 + ir_2 t_1 & -t_2 t_1 e^{i\theta_L} + r_2 r_1 \end{bmatrix}$$

where, $t_1 = \sqrt{1-r_1^2}$, $t_2 = \sqrt{1-r_2^2}$, and after the components are manufactured, $r_1$, $r_2$, $t_1$, and $t_2$ are known. A relationship between input ports A and B and output ports C and D may be expressed as:

$$\begin{bmatrix} L_1' \\ L_2' \end{bmatrix} = U_{MZI}(\theta_L; r_1, r_2) \begin{bmatrix} L_1 \\ L_2 \end{bmatrix} \quad (4)$$

where, $L_1$ and $L_2$ correspond to signals at A port and B port, $L_1'$ and $L_2'$ correspond to signals at C port and D port. $U_{MZI}(\theta_L; r_1, r_2)$ is put into the equation to obtain:

$$L_1' = (r_2 e^{i\theta_L} r_1 - t_2 t_1)L_1 + (r_2 e^{i\theta_L} it_1 + it_2 r_1)L_2$$

$$L_2' = (it_2 e^{i\theta_L} r_1 - ir_2 t_1)L_1 + (r_2 r_1 - t_2 t_1 e^{i\theta_L})L_2 \quad (5)$$

1) In order to satisfy $$\frac{P_{A\to C}}{P_A} = \frac{1}{2},$$

if $L_1 = A_1 \cos\theta_1 + iA_1 \sin\theta_1$ and $L_2 = 0$, the following may be obtained according to Euler's formula and trigonometric formula:

$$L_1' = (r_2(\cos\theta_L + i\sin\theta_L)r_1 - t_2 t_1)(A_1\cos\theta_1 + iA_1\sin\theta_1) \quad (6)$$

$$= (r_1 r_2 A_1 \cos(\theta_1 + \theta_L) - t_1 t_2 A_1 \cos\theta_1) +$$

$$i(r_1 r_2 A_1 \sin(\theta_1 + \theta_L) - t_1 t_2 A_1 \sin\theta_1)$$

$P_{A\to C}$ is the sum of the square of a real part and the square of an imaginary part $L_1'$, that is, $$P_{A\to C} = (r_1 r_2 A_1 \cos(\theta_1 + \theta_L) - t_1 t_2 A_1 \cos\theta_1)^2 + \quad (7)$$

$$(r_1 r_2 A_1 \sin(\theta_1 + \theta_L) - t_1 t_2 A_1 \sin\theta_1)^2$$

$$= (r_1 r_2 A_1)^2 + (t_1 t_2 A_1)^2 - 2r_1 r_2 t_1 t_2 A_1 A_1 \cos\theta_L$$

$$= A_1^2((r_1 r_2)^2 + (t_1 t_2)^2 - 2r_1 r_2 t_1 t_2 \cos\theta_L)$$

If $$P_{A\to C} = \frac{1}{2}P_A = \frac{1}{2}A_1^2$$

is satisfied, $$\cos\theta_L = \frac{(r_1 r_2)^2 + (t_1 t_2)^2 - 1/2}{2r_1 r_2 t_1 t_2} \quad (8)$$

may be obtained.

2) In order to satisfy $$\frac{P_{A\to D}}{P_A} = \frac{1}{2},$$

if $L_1 = A_1 \cos\theta_1 + iA_1 \sin\theta_1$ and $L_2 = 0$, the following may be obtained:

$$L_2' = (it_2(\cos\theta_L + i\sin\theta_L)r_1 + ir_2 t_1)A_1\cos\theta_1 + iA_1\sin\theta_1) \quad (9)$$

$$= (-r_1 t_2 A_1 \sin(\theta_1 + \theta_L) - t_1 r_2 A_1 \sin\theta_1) +$$

$$i(r_1 t_2 A_1 \cos(\theta_L + \theta_1) + t_1 r_2 A_1 \cos\theta_1)$$

$$P_{A\to D} = (-r_1 t_2 A_1 \sin(\theta_1 + \theta_L) - t_1 r_2 A_1 \sin\theta_1)^2 + \quad (10)$$

$$(r_1 t_2 A_1 \cos(\theta_L + \theta_1) + t_1 r_2 A_1 \cos\theta_1)^2$$

$$= A_1^2((t_2 r_1)^2 + (r_2 t_1)^2 + 2t_2 r_1 \cos\theta_L r_2 t_1)$$

If $$P_{A\to D} = \frac{1}{2}P_A = \frac{1}{2}A_1^2$$

is satisfied, $$\cos\theta_L = \frac{1/2 - (t_2 r_1)^2 - (r_2 t_1)^2}{2 t_2 r_1 r_2 t_1} \quad (11)$$

may be obtained.

3) In order to satisfy $$\frac{P_{B \to C}}{P_B} = \frac{1}{2},$$

if $L_1=0$ and $L_2=A_2 \cos\theta_2 + iA_2 \sin\theta_2$, the following may be obtained:

$$L_1' = (r_2(\cos\theta_L + i\sin\theta_L)it_1 + it_2 r_1)(A_2 \cos\theta_2 + iA_2 \sin\theta_2) \quad (12)$$

$$= (-t_1 r_2 A_2 (\sin(\theta_L + \theta_2)) - t_2 r_1 A_2 \sin\theta_2) +$$

$$i(t_1 r_2 A_2 \cos(\theta_L + \theta_2) + t_2 r_1 A_2 \cos\theta_2)$$

$$P_{B \to C} = (-t_1 r_2 A_2 (\sin(\theta_L + \theta_2)) - t_2 r_1 A_2 \sin\theta_2)^2 + \quad (13)$$

$$(t_1 r_2 A_2 \cos(\theta_L + \theta_2) + t_2 r_1 A_2 \cos\theta_2)^2$$

$$= A_2^2 \big((r_2 t_1)^2 + (r_1 t_2)^2 + 2 t_1 r_2 \cos\theta_L r_1 t_2\big)$$

If $$P_{B \to C} = \frac{1}{2} P_B = \frac{1}{2} A_2^2, \cos\theta_L = \arccos\frac{1/2 - (r_2 t_1)^2 - (t_2 r_1)^2}{2 r_2 t_1 t_2 r_1} \quad (14)$$

may be obtained.

4) In order to satisfy $$\frac{P_{B \to D}}{P_B} = \frac{1}{2},$$

if $L_1=0$ and $L_2=A_2 \cos\theta_2 + iA_2 \sin\theta_2$, the following may be obtained:

$$L_2' = (-t_2 t_1 (\cos\theta_L + i\sin\theta_L) + r_2 r_1)(A_2 \cos\theta_2 + iA_2 \sin\theta_2) \quad (15)$$

$$= (-t_2 t_1 A_2 \cos(\theta_L + \theta_2) + r_2 r_1 A_2 \cos\theta_2) +$$

$$i(-t_2 t_1 A_2 \sin(\theta_2 + \theta_L) + r_2 r_1 A_2 \sin\theta_2)$$

$$P_{B \to D} = (-t_2 t_1 A_2 \cos(\theta_L + \theta_2) + r_2 r_1 A_2 \cos\theta_2)^2 + \quad (16)$$

$$(-t_2 t_1 A_2 \sin(\theta_2 + \theta_L) + r_2 r_1 A_2 \sin\theta_2)^2$$

$$= A_2^2 \big((t_2 t_1)^2 + (r_2 r_1)^2 - 2 t_2 t_1 r_2 r_1 \cos\theta_L\big)$$

If $$P_{B \to D} = \frac{1}{2} P_B = \frac{1}{2} A_2^2, \cos\theta_L = \frac{(t_2 t_1)^2 + (r_2 r_1)^2 - 1/2}{2 r_2 t_1 t_2 r_1} \quad (17)$$

may be obtained.

It might be known based on $t_1=\sqrt{1-r_1^2}$ and $t_2=\sqrt{1-r_2^2}$ that the equations (8), (11), (14), and (17) are equal, which satisfies the energy conservation and symmetry of the MZI.

Similarly, the parameter of the internal phase shifter of the right beam splitter, that is, the second interference optical path structure, may be calculated based on the foregoing derivation process. Because subscripts of the two parameters are different and others are the same, for the conciseness of description, the derivation process is not described in detail here, and a parameter calculation relational expression for the internal phase shifter of the second interference optical path structure is as follows:

$$\cos\theta_R = \frac{(t_3 t_4)^2 + (r_3 r_4)^2 - 1/2}{2 r_3 r_4 t_3 t_4} \quad (18)$$

Based on the foregoing embodiments, in practice, if the preset beam-splitting ratio is 50:50, the first parameter calculation relational expression may be obtained by solving the first interference optical path optical parameter calculation relational expression, the parameter of the first internal phase shifter is determined according to the first parameter calculation relational expression, and the first parameter calculation relational expression is as follows:

$$\cos\theta_L = \frac{(t_2 t_1)^2 + (r_2 r_1)^2 - 1/2}{2 r_2 t_1 t_2 r_1}.$$

The second parameter calculation relational expression is obtained by solving the second interference optical path optical parameter calculation relational expression, the parameter of the second internal phase shifter is determined according to the second parameter calculation relational expression, and the second parameter calculation relational expression is as follows:

$$\cos\theta_R = \frac{(t_3 t_4)^2 + (r_3 r_4)^2 - 1/2}{2 r_3 r_4 t_3 t_4}.$$

It will be appreciated that compensation for the beam splitter has requirements for optical parameters of the original beam splitter, and the more the requirements are met, the higher the compensation accuracy will be, and correspondingly, the better the performance of the optical neural network will be. Based on this, in the present application, before the step of respectively acquiring initial optical information, intermediate input optical information at an input port of the phase shifter, intermediate output optical information at an output port of the phase shifter, and final output optical information of two paths of input optical signals, the method may further include:

beam-splitting ratios of the beam splitters of the first interference optical path structure and the second interference optical path structure are respectively acquired; and whether the beam-splitting ratios of the beam splitters satisfy a beam-splitting compensation condition is determined, and the step of respectively acquiring initial optical information, intermediate input optical information at an input port of the phase shifter, intermediate output optical information at on output port of the phase shifter, and final output optical information of two paths of input optical signals is performed in a case that the beam-splitting ratios of the beam splitters satisfy the beam-splitting compensation condition. If the beam-splitting ratio of any one of the beam splitters does not satisfy the beam-splitting compensation condition, the beam splitters of the optical neural network will not be compensated.

The beam-splitting compensation condition may be calculated based on the preset beam-splitting ratio, and if the preset beam-splitting condition is 50:50, and the beam-splitting compensation condition is that the beam-splitting ratio of the beam splitter is within a range of 15:85 to 85:15. A specific calculation process may include:

because $\cos^2\theta_L \leq 1$, $$\cos\theta_L = \frac{(t_2 t_1)^2 + (r_2 r_1)^2 - 1/2}{2 r_2 t_1 t_2 r_1}$$

satisfies:

$$\left(\frac{(r_1 r_2)^2 + (t_1 t_2)^2 - 1/2}{2 r_1 r_2 t_1 t_2}\right)^2 \leq 1 \qquad (19)$$

It might be known based on $t_1 = \sqrt{1-r_1^2}$ and $t_2 = \sqrt{1-r_2^2}$ that:

$$((r_1 r_2)^2 + (1-r_1^2)(1-r_2^2) - 1/2)^2 \leq (2 r_1 r_2 \sqrt{1-r_1^2}\sqrt{1-r_2^2}) \qquad (20)$$

Equation (20) is simplified to obtain:

$$r_1^4 + r_2^4 \leq r_1^2 + r_2^2 - \frac{1}{4} \qquad (21)$$

If $r_i^2 \geq 0.15$, equation (21) will be satisfied. Because of the symmetry of r and t, and $t_i^2 \geq 0.15$, the method may be used for compensating a beam splitter with a beam-splitting ratio of 15:85 to 85:15.

It might be known from the above that in this embodiment, the beam splitter with a beam-splitting ratio of 50:50 may be replaced with an MZI with a beam-splitting ratio of 15:85 to 85:15. The beam splitter with a beam-splitting ratio is simulated by adjusting the parameter of the phase shifter, so as to implement an MZI of the beam splitter with an accurate beam-splitting ratio of 50:50, and improve the accuracy and stability of the MZI-based optical neural network.

The embodiments of the present application further provide a corresponding apparatus for the data processing method based on an optical neural network, which further makes the method more practical. The apparatus may be described from the perspective of functional modules and hardware, respectively. The data processing apparatus based on an optical neural network according to the embodiments of the present application will be introduced below, and the data processing apparatus based on an optical neural network described below and the data processing method based on an optical neural network described above may refer to each other correspondingly.

From the perspective of functional modules, referring to FIG. 4, FIG. 4 is a structural diagram of a specific implementation mode of a data processing apparatus based on optical neural network according to an embodiment of the present application, a structure of the optical neural network to which this embodiment is applied is that: an optical interference unit of the optical neural network includes a first interference optical path structure, a phase shifter, and a second interference optical path structure, the first interference optical path structure and the second interference optical structure each include an internal phase shifter and a beam splitter, and the apparatus includes:

an optical information acquiring module 401, configured to respectively require initial optical information, intermediate input optical information at an input port of the phase shifter, intermediate output optical information at an output port of the phase shifter, and final optical information of an input optical signal; and a calculation module 402, configured to calculate parameters of the internal shifters of the first interference optical path structure and the second interference optical path structure in a case that the initial optical information and the intermediate input optical information as well as the intermediate output optical information and the final output optical information satisfy a preset beam-splitting condition of the optical neural network, so as to perform data processing by using the optical neural network based on the parameters.

In some embodiments, in some implementation modes of this embodiment, the foregoing calculation module 402 may include a first optical parameter. The input optical signal includes two paths of input optical signals, the first interference optical path structure includes a first beam splitter, a first internal phase shifter, and a second beam shifter, an input optical signal of the optical neural network is inputted into the first internal phase shifter by the first beam splitter, an optical signal outputted by the first internal phase shifter is inputted into the phase shifter by the second beam splitter, the first optical parameter calculation unit is configured to invoke a first interference optical path optical parameter calculation relational expression to determine a parameter of the first internal phase shifter, the first interference optical path optical parameter calculation relational expression is as follows:

$$\begin{cases} L_1' = (r_2 e^{i\theta_L} r_1 - t_2 t_1)L_1 + (r_2 e^{i\theta_L} it_1 + it_2 r_1)L_2 \\ L_2' = (it_2 e^{i\theta_L} r_1 + ir_2 t_1)L_1 + (r_2 r_1 - t_2 t_1 e^{i\theta_L})L_2 \end{cases},$$

where, $L'_1$ is intermediate input optical information of a first input optical signal of the optical neural network at the input port of the phase shifter, 1:2 is intermediate input optical information of a second input optical signal of the optical neural network at the input port of the phase shifter, $L_1$ is initial optical information of the first input optical signal, $L_2$ is initial optical information of the second input optical signal, $r_1$ is the reflectance of the first beam splitter, $r_2$ is the reflectance of the second beam splitter, $t_1$ is an intermediate parameter and $t_1 = \sqrt{1-r_1^2}$, $t_2$ is an intermediate parameter and $t_2 = \sqrt{1-r_2^2}$, i represents an imaginary number, e represents an exponent, and $\theta_L$ is a parameter of the first internal phase shifter.

As an optical implementation mode of this embodiment, the present beam-splitting condition is 50:50, the foregoing first optical parameter calculation unit is further configured to solve the first interference optical path optical parameter calculation relational expression to obtain a first parameter calculation relational expression, and determine a parameter of the first phase shifter according to the first parameter calculation relational expression, and the first parameter calculation relational expression is as follows:

$$\cos\theta_L = \frac{(t_2 t_1)^2 + (r_2 r_1)^2 - 1/2}{2 r_2 t_1 t_2 r_1}.$$

In some embodiments, in some other implementation modes of this embodiment, the foregoing calculation module 402 may include a second optical parameter calculation unit. The input optical signal includes two paths of input optical signals, the second interference optical path structure includes a third beam splitter, a second internal phase shifter, and a fourth beam splitter, an input optical signal of the phase shifter is inputted into the second internal phase shifter by the third beam splitter, an optical signal outputted by the second internal phase shifter is split and outputted by the fourth beam splitter, the second optical parameter calculation unit is configured to invoke a second interference optical path optical parameter calculation relational expression to determine a parameter of the second internal phase shifter, and the second interference optical path optical parameter calculation relational expression is as follows:

$$\begin{cases} L'_3 = (r_4 e^{i\theta_R} r_3 - t_4 t_3) L_3 + (r_4 e^{i\theta_R} i t_3 + i t_4 r_3) L_4 \\ L'_4 = (i t_4 e^{i\theta_R} r_3 + i r_4 t_3) L_3 + (r_4 r_3 - t_4 t_3 e^{i\theta_R}) L_4 \end{cases},$$

where, $L'_3$ is final output optical information of a first input optical signal, $L'_4$ is final output optical information of a second input optical signal, $L_3$ is intermediate output optical information of the first input optical signal at the output port of the phase shifter, $L_4$ is intermediate output optical information of the second input optical signal at the output port of the phase shifter, $r_3$ is the reflectance of the third beam splitter, $r_4$ is the reflectance of the fourth beam splitter, $t_3$ is an intermediate parameter and $t_3=\sqrt{1-r_3^2}$, $t_4$ is an intermediate parameter and $t_4=\sqrt{1-r_4^2}$, i represents an imaginary number, e represents an exponent, and $\theta_R$ is a parameter of the second internal phase shifter.

As an optional implementation mode of this embodiment, the preset beam-splitting condition is 50:50, the foregoing second optical parameter calculation unit is configured to solve the second interference optical path optical parameter calculation relational expression to obtain a second parameter calculation relational expression, and determine a parameter of the second internal phase shifter according to the second parameter calculation relational expression, and the second parameter calculation relational expression is as follows:

$$\cos\theta_R = \frac{(t_3 t_4)^2 + (r_3 r_4)^2 - 1/2}{2 r_3 r_4 t_3 t_4}.$$

In some embodiments, in some other implementation modes of this embodiment, the foregoing apparatus may further include, for example, a data pre-processing module, which include:

a condition presetting unit, configured to preset a beam-splitting compensation condition;
a parameter information acquiring unit, configured to respectively acquire beam-splitting ratios of the beam splitters of the first interference optical path structure and the second interference optical path structure; and
a determination execution module, configured to determine whether the beam-splitting ratios of the beam splitters satisfy the beam-splitting compensation condition, and operate the optical information acquiring module 401 in a case that the beam-splitting ratios of the beam splitters satisfy the beam-splitting compensation condition.

As an optional implementation mode of this embodiment, the foregoing condition presetting unit is configured to preset the beam-splitting compensation condition to be that the beam-splitting ratios of the beam splitters are within a range of 15:85 to 85:15 if the preset beam-splitting condition is 50:50.

The functions of the functional modules of the data processing apparatus based on an optical neural network according to the embodiments of the present application may be in some embodiments implemented according to the method in the foregoing method embodiments, and a specific implementation process may refer to the relevant description of the foregoing method embodiments and is not described in detail here.

It might be known from the above that in the embodiments of the present application, the beam splitters of the optical neural network are compensated, which solves the technical problem of poor performance of an optical neural network due to low beam-splitting accuracy of a beam splitter in the related technology, effectively improves the performance of the optical neural network, and improves the data processing accuracy.

Figure 5:
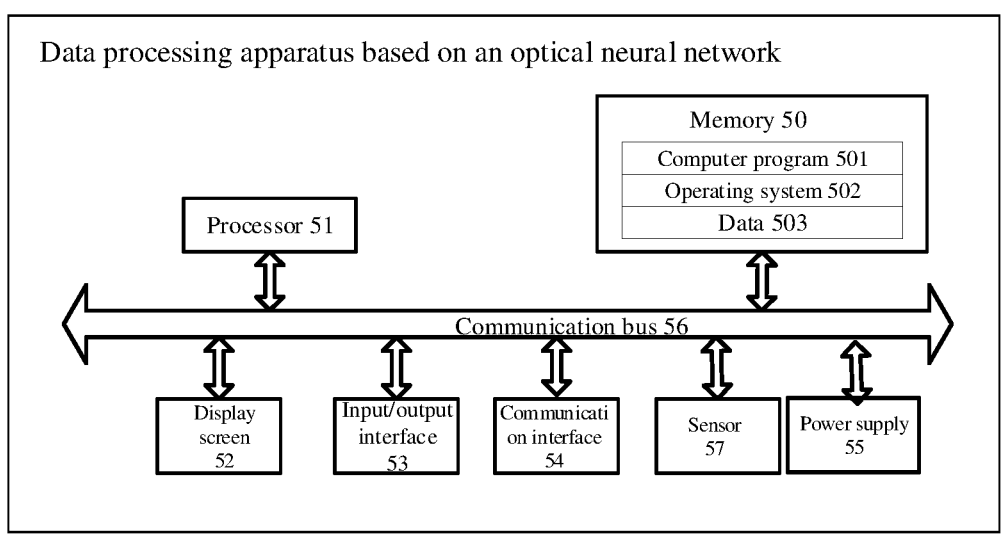
FIG. 5 is a structural diagram of another specific implementation mode of a data processing apparatus based on an optical neural network according to an embodiment of the present application.

The foregoing data processing apparatus based on an optical neural network is described from the perspective of functional modules, and the present application further provides a data processing apparatus based on an optical neural network, which will be described from the perspective of hardware. FIG. 5 is a structural diagram of another data processing apparatus based on an optical neural network according to an embodiment of the present application. As shown in FIG. 5, the apparatus includes a memory 50 configured to store a computer program, and a processor 51 configured to execute the computer program to implement the steps in the data processing method based on an optical neural network according to any one of the foregoing embodiments.

The processor 51 may include one or more processing cores, such as a 4-core processor and an 8-core processor. The processor 51 may be implemented in at least one hardware form of digital signal processing (DSP), a field-programmable gate array (FPGA), and a programmable logic array (PLA). The processor 51 may also include a main processor and a co-processor, the main processor is a processor configured to process data in an awake state and is also referred to as central processing unit (CPU), and the co-processor is a low power processor configured to process data in a stand-by state. In some embodiment, the processor 51 may be integrated with a graphics processing unit (GPU) configured to render and draw content that needs to be displayed on a display screen. In some embodiments, the processor 51 may further include an artificial intelligence (AI) processor configured to process computing operations related to machine learning.

The memory 50 may include one or more computer-readable storage media that may be non-transient. The memory 50 may further include a high speed random access memory and a non-volatile memory, such as one or more disk storage devices and flash storage devices. In this embodiment, the memory 50 is at least configured to store the following computer program 501 that, when loaded and executed by the processor 51, implements the relevant steps in the data processing method based on an optical neural network according to any one of the foregoing embodiments. In addition, resources stored in the memory 50 may further include an operating system 502, data 503, and the like, and a storage mode may be a transient storage mode or a permanent storage mode. The operating system 502 may include Windows, Unix, Linux, and the like. The data 503 may include, but is not limited to, data corresponding to a result of data processing based on an optical neural network, and the like.

In some embodiments, the data processing apparatus based on an optical neural network may further include a display screen 52, an input/output interface 53, a communication interface 54 (or referred to as a network interface), a power supply 55, and a communication bus 56. The display screen 52 and the input/output interface 53, such as a keyboard, belong to user interfaces, and optical user interfaces may further include a standard wired interface, wireless interface, and the like. In some embodiments, in some embodiments, the display may be a light-emitting diode (LED) display, a liquid crystal display, a touch liquid crystal display, an organic light-emitting diode (OLED) touch panel, or the like. The display may also be properly referred to as a display screen or a display unit, and is configured to display information processed in the data processing apparatus based on an optical neural network and display a visual user interface. In some embodiments, the communication interface 54 may include a wired interface and/or a wireless interface, such as a WI-FI interface and a Bluetooth interface, is usually configured to establish communication connection between the data processing apparatus based on an optical neural network and another electronic device. The communication but 56 may be a peripheral component interconnect (PCI) bus, an extended industry standard architecture (EISA) bus, or the like. The bus may be divided into an address bus, a data bus, a control bus, and the like. For ease of representation, the bus is represented by a thick line only in FIG. 5, but it does not mean that there is only one piece of bus or only one type of bus.

Those skilled in the art will appreciate that the structure shown in FIG. 5 does not constitute a limitation to the data processing apparatus based on an optical neural network, and the apparatus may include more or less components than those shown in the figure, for example, may further include a sensor 57 for realizing various functions.

The functions of the functional modules of the data processing apparatus based on a neural network according to the embodiments of the present application may be in some embodiments implemented according to the foregoing method embodiments, and a specific implementation process may refer to the relevant description of the foregoing method embodiments and is not described in detail here.

It might be known from the above that in the embodiments of the present application, the beam splitters of the optical neural network are compensated, which solves the technical problem of poor performance of an optical neural network due to low beam-splitting accuracy of a beam splitter in the related technology, effectively improves the performance of the optical neural network, and improves the data processing accuracy.

It will be appreciated that the data processing method based on an optical neural network according to the foregoing embodiments may be stored in a computer-readable storage medium when implemented in the form of software functional units and sold or used as a separate product. Based on this understanding, the technical solutions of the present application are essentially or the part that contributes to the prior art or all or some of the technical solutions may be embodied in the form of a software product, and the computer software product is stored in a storage medium and configured to implement all or some of the steps in the method according to the embodiments of the present application. The foregoing storage medium includes: a universal serial bus disk, a mobile hard disk, a read-only memory (ROM), a random access memory (RAM), an electrically erasable programmable ROM, a register, a hard disk, a removable disk, a compact disc read-only memory (CD-ROM), a diskette, an optical disk, and other media capable of storing program codes.

Based on this, the present application further provides a computer-readable storage medium, which stores a data processing program based on an optical neural network that, when executed by a processor, performs the steps in the data processing method based on an optical neural network according to any one of the foregoing embodiments.

Figure 6:
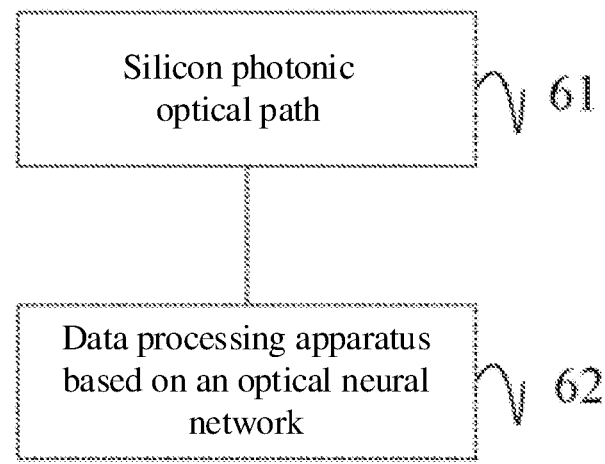
FIG. 6 is a structural diagram of a specific implementation mode of an optical neural network according to an embodiment of the present application.

The embodiments of the present application further provide an optical neural network, referring to FIG. 6, which may include the following content.

It will be appreciated that the optical neural network may include an input layer, an output layer, and hidden layers in the middle. The hidden layers in the middle include an optical interference unit (OIU) and an optical non-linear unit (ONU) that play the role of matrix multiplication and function activation, respectively. The optical interference unit may be, for example, implemented based on a programmable nanophotonic device of a Mach-Zehnder interferometer (MZI). The MZI may be, for example, constructed by connecting upper and lower silicon waveguide branches through a coupler. An internal phase shifter controls an output beam-splitting ratio by altering the refractive index of the waveguide, and an external phase shifter controls differential output and phase delay. The ONU may be implemented by optical hardware with non-linear characteristics, such as a saturable absorber and optical bistability. The OIU is integrated in a silicon photonic circuit and is also referred to as a silicon photonic integrated circuit. The optical neural network of this embodiment includes a silicon photonic optical path 61 and the data processing apparatus 62 based on an optical neural network according to any one of the foregoing embodiments.

An optical interference unit of the silicon photonic optical path 61 includes a first interference optical path structure, a phase shifter, and a second interference optical path structure. The first interference optical path structure includes a first internal phase shifter, a first beam splitter, a second beam splitter, and the second interference optical path structure includes a second internal phase shifter, a third beam splitter, and a fourth beam splitter. A first input optical signal and a second input optical signal of the optical neural network respectively pass through the first beam splitter and are inputted into the first internal phase shifter, pass through the first internal phase shifter and are inputted into the phase shifter by the second beam splitter, pass through the phase shifter and inputted into the second internal shifter by the third beam splitter, and pass through the second internal phase shifter and are outputted by the fourth beam splitter.

The first interference optical path structure and the second interference optical path structure may be both, for example, an MZI structure, as shown in FIG. 3. Certainly, other interference optical paths may also be adopted, which do not affect the implementation of the present application.

The functions of the functional module, optical devices or electrical devices of the optical neural network according to the embodiments of the present application may be in some embodiments implemented according to the method in the foregoing method embodiments, and a specific implementation process may refer to the relevant description of the foregoing method embodiments and is not described in detail here.

It might be known from the above that in the embodiments of the present application, the beam splitters of the optical neural network are compensated, which solves the technical problem of poor performance of an optical neural network due to low beam-splitting accuracy of a beam splitter in the related technology, effectively improves the performance of the optical neural network, and improves the data processing accuracy.

The embodiments of this description are described in a progressive manner, each embodiment focuses on the difference from other embodiments, and the same or similar parts of the embodiments may refer to each other. Because the apparatus disclosed in the embodiments corresponds to the method disclosed in the embodiments, the description of the apparatus is relatively simple, and the related parts refer to the description of the method.

Those skilled in the art will further realize that the exemplary units and algorithm steps described with reference to the embodiments disclosed herein might be implemented by electronic hardware, computer software or a combination of the two. In order to clearly describe the interchangeability of hardware and software, the exemplary compositions and steps have been generally described in terms of functions in the above description. Whether these functions are implemented in the form of hardware or software is determined according to a specific application and design constraints of the technical solutions. Those skilled in the art may implement the described functions by different methods for each specific application, and the implementation shall not be regarded as exceeding the scope of the present application.

The data processing method and apparatus based on an optical neural network, the computer-readable storage medium, and the optical neural network of the present application have been described in detail above. Specific examples are used here to describe the principle and implementation modes of the present application, and the descriptions of the foregoing embodiments are only used to help understand the methods and core ideas of the present application. It should be pointed out that those of ordinary skill in the art may make several improvements and modifications to the present application without departing from the principle of the present application, and these improvements and modifications shall fall within the scope of protection of the present application.

REFERENCE SIGNS 300 optical interference unit of optical neural network
301 first interference optical path structure
302 second interference optical path structure
303 first beam splitter
304 first internal phase shifter
305 second beam splitter
306 phase shifter
307 third beam splitter
308 second internal phase shifter
309 fourth beam splitter

What is claimed is:

1. A data processing method based on an optical neural network, wherein an optical interference unit of the optical neural network comprises a first interference optical path structure, a phase shifter, and a second interference optical path structure, the first interference optical path structure and the second interference optical path structure each comprise an internal phase shifter and an optical shifter, and the method comprises:
respectively acquiring beam-splitting ratios of beam splitters of the first interference optical path structure and the second interference optical path structure;
in response to the beam-splitting ratios of the beam splitters satisfying a beam-splitting compensation condition, respectively acquiring initial optical information, intermediate input optical information at an input port of the phase shifter, intermediate output optical information at an output port of the phase shifter, and final output optical information of an input optical signal; and
in response to the initial optical information and the intermediate input optical information as well as the intermediate output optical information and the final output optical information satisfying a preset beam-splitting condition of the optical neural network, calculating parameters of internal phase shifters of the first interference optical path structure and the second interference optical path structure, so as to perform data processing by using the optical neural network based on the parameters.

2. The data processing method based on an optical neural network according to claim 1, wherein the input optical signal comprises a first input optical signal and a second input optical signal, and the in response to the initial optical information and the intermediate input optical information as well as the intermediate output optical information and the final output optical information satisfying a preset beam-splitting condition of the optical neural network, calculating parameters of internal phase shifters of the first interference optical path structure and the second interference optical path structure comprises:
the first interference optical path structure comprising a first beam splitter, a first internal phase shifter, and a second beam splitter, inputting, by the first beam splitter, the input optical signal of the optical neural network into the first internal phase shifter, and inputting, by the second beam splitter, an optical signal outputted by the first internal phase shifter into the phase shifter; and
invoking a first interference optical path optical parameter calculation relational expression to determine a parameter of the first internal phase shifter, the first interference optical path optical parameter calculation relational expression being as follows:

$$\begin{cases} L'_1 = (r_2 e^{i\theta_L} r_1 - t_2 t_1) L_1 + (r_2 e^{i\theta_L} it_1 + it_2 r_1) L_2 \\ L'_2 = (it_2 e^{i\theta_L} r_1 + ir_2 t_1) L_1 + (r_2 r_1 - t_2 t_1 e^{i\theta_L}) L_2 \end{cases},$$

wherein, $L_1'$ is the intermediate input optical information of the first input optical signal of the optical neural network at the input port of the phase shifter, $L_2'$ is the intermediate input optical information of the second input optical signal of the optical neural network at the input port of the phase shifter, $L_1$ is the initial optical information of the first input optical signal, $L_2$ is the initial optical information of the second input optical signal, $r_1$ is a reflectance of the first beam splitter, $r_2$ is a reflectance of the second beam splitter, $t_1$ is an intermediate parameter and $t_1 = \sqrt{1-r_1^2}$, $t_2$ is a second intermediate parameter and $t_2 = \sqrt{1-r_2^2}$, i represents an imaginary number, e represents an exponent, and OL is the parameter of the first internal phase shifter.

3. The data processing method based on an optical neural network according to claim 2, wherein the in response to the initial optical information and the intermediate input optical information as well as the intermediate output optical information and the final output optical information satisfying a preset beam-splitting condition of the optical neural network, calculating parameters of internal phase shifters of the first interference optical path structure and the second interference optical path structure comprises:

the preset beam-splitting condition being 50:50, solving the first interference optical path optical parameter calculation relational expression to obtain a first parameter calculation relational expression; and determining the parameter of the first internal phase shifter according to the first parameter calculation relational expression, the first parameter calculation relational expression being as follows:

$$\cos\theta_L = \frac{(t_2 t_1)^2 + (r_2 r_1)^2 - 1/2}{2 r_2 t_1 t_2 r_1}.$$

4. The data processing method based on an optical neural network according to claim 1, wherein the input optical signal comprises a first input optical signal and a second input optical signal, and the in response to the initial optical information and the intermediate input optical information as well as the intermediate output optical information and the final output optical information satisfying a preset beam-splitting condition of the optical neural network, calculating parameters of internal phase shifters of the first interference optical path structure and the second interference optical path structure comprises:

the second interference optical path structure comprising a third beam splitter, a second internal phase shifter, and a fourth beam splitter, inputting, by the third beam splitter, an input optical signal of the phase shifter into the second internal phase shifter, and splitting and outputting, by the fourth beam splitter, an optical signal outputted by the second internal phase shifter; and invoking a second interference optical path optical parameter calculation relational expression to determine a parameter of the second internal phase shifter, the second interference optical path optical parameter calculation relational expression being as follows:

$$\begin{cases} L_3' = (r_4 e^{i\theta_R} r_3 - t_4 t_3) L_3 + (r_4 e^{i\theta_R} it_3 + it_4 r_3) L_4 \\ L_4' = (it_4 e^{i\theta_R} r_3 + ir_4 t_3) L_3 + (r_4 r_3 - t_4 t_3 e^{i\theta_R}) L_4 \end{cases},$$

wherein, $L_3'$ is the final output optical information of the first input optical signal, $L_4'$ is the final output optical information of the second input optical signal, $L_3$ is the intermediate output optical information of the first input optical signal at the output port of the phase shifter, $L_4$ is the intermediate output optical information of the second input optical signal at the output port of the phase shifter, $r_3$ is a reflectance of the third beam splitter, $r_4$ is a reflectance of the fourth beam splitter, $t_3$ is an intermediate parameter and $t_3 = \sqrt{1-r_3^2}$, $t_4$ is a second intermediate parameter and $t_4 = \sqrt{1-r_4^2}$, i represents an imaginary number, e represents an exponent, and OR is the parameter of the second internal phase shifter.

5. The data processing method based on an optical neural network according to claim 4, wherein the in response to the initial optical information and the intermediate input optical information as well as the intermediate output optical information and the final output optical information satisfying a preset beam-splitting condition of the optical neural network, calculating parameters of internal phase shifters of the first interference optical path structure and the second interference optical path structure comprises:

the preset beam-splitting condition being 50:50, solving the second interference optical path optical parameter calculation relational expression to obtain a second parameter calculation relational expression; and determining the parameter of the second internal phase shifter according to the second parameter calculation relational expression, the second parameter calculation relational expression being as follows:

$$\cos\theta_R = \frac{(t_3 t_4)^2 + (r_3 r_4)^2 - 1/2}{2 r_3 r_4 t_3 t_4}.$$

6. The data processing method based on an optical neural network according to claim 1, wherein the preset beam-splitting condition is 50:50, and the data processing method comprises:

determining whether the beam-splitting ratios of the beam splitters satisfy the beam-splitting compensation condition, wherein the determining whether the beam-splitting ratios of the beam splitters satisfy the beam-splitting compensation condition comprises:

determining whether the beam-splitting ratios of the beam splitters are within a range of 15:85 to 85:15.

7. The data processing method based on an optical neural network according to claim 1, wherein the initial optical information comprises an optical power.

8. The data processing method based on an optical neural network according to claim 1, further comprising:

in response to the beam-splitting ratios of any one of the beam splitters not satisfying the beam-splitting compensation condition, not compensating the beam splitters of the optical neural network.

9. The data processing method based on an optical neural network according to claim 1, wherein the optical interference unit of the optical neural network is integrated in a silicon photonic circuit.

10. A data processing apparatus based on an optical neural network, comprising a processor configured to execute a computer program stored in a memory, wherein an optical interference unit of the optical neural network comprises a first interference optical path structure, a phase shifter, and a second interference optical path structure, the first interference optical path structure and the second interference optical path structure each comprise an internal phase shifter and an optical shifter, and upon execution of the computer program, the processor is configured to:

respectively acquire beam-splitting ratios of beam splitters of the first interference optical path structure and the second interference optical path structure;

in response to the beam-splitting ratios of the beam splitters satisfying a beam-splitting compensation condition, respectively acquire initial optical information, intermediate input optical information at an input port of the phase shifter, intermediate output optical information at an output port of the phase shifter, and final output optical information of an input optical signal; and in response to the initial optical information and the intermediate input optical information as well as the intermediate output optical information and the final output optical information satisfying a preset beam-splitting condition of the optical neural network, calculate parameters of internal phase shifters of the first interference optical path structure and the second interference optical path structure, so as to perform data processing by using the optical neural network based on the parameters.

11. The data processing apparatus based on an optical neural network according to claim 10, wherein the input optical signal comprises a first input optical signal and a second input optical signal, and the processor, upon execution of the computer program, is configured to:

the first interference optical path structure comprising a first beam splitter, a first internal phase shifter, and a second beam splitter, input, by the first beam splitter, the input optical signal of the optical neural network into the first internal phase shifter, and input, by the second beam splitter, an optical signal outputted by the first internal phase shifter into the phase shifter; and invoke a first interference optical path optical parameter calculation relational expression to determine a parameter of the first internal phase shifter, the first interference optical path optical parameter calculation relational expression being as follows:

$$\begin{cases} L'_1 = (r_2 e^{i\theta_L} r_1 - t_2 t_1) L_1 + (r_2 e^{i\theta_L} it_1 + it_2 r_1) L_2 \\ L'_2 = (it_2 e^{i\theta_L} r_1 + ir_2 t_1) L_1 + (r_2 r_1 - t_2 t_1 e^{i\theta_L}) L_2 \end{cases},$$

wherein, $L_1'$ is the intermediate input optical information of the first input optical signal of the optical neural network at the input port of the phase shifter, $L_2'$ is the intermediate input optical information of the second input optical signal of the optical neural network at the input port of the phase shifter, $L_1$ is the initial optical information of the first input optical signal, $L_2$ is the initial optical information of the second input optical signal, $r_1$ is a reflectance of the first beam splitter, $r_2$ a reflectance of the second beam splitter, $t_1$ is an intermediate parameter and $t_1=\sqrt{1-r_1^2}$, $t_2$ is a second intermediate parameter and $t_2=\sqrt{1-r_2^2}$, i represents an imaginary number, e represents an exponent, and $\theta_L$ is the parameter of the first internal phase shifter.

12. The data processing apparatus based on an optical neural network according to claim 11, wherein the processor, upon execution of the computer program, is configured to:

the preset beam-splitting condition being 50:50, solve the first interference optical path optical parameter calculation relational expression to obtain a first parameter calculation relational expression; and determine the parameter of the first internal phase shifter according to the first parameter calculation relational expression, the first parameter calculation relational expression being as follows:

$$\cos\theta_L = \frac{(t_2 t_1)^2 + (r_2 r_1)^2 - 1/2}{2 r_2 t_1 t_2 r_1}.$$

13. The data processing apparatus based on an optical neural network according to claim 10, wherein the input optical signal comprises a first input optical signal and a second input optical signal, and the processor, upon execution of the computer program, is configured to:

the second interference optical path structure comprising a third beam splitter, a second internal phase shifter, and a fourth beam splitter, input, by the third beam splitter, an input optical signal of the phase shifter into the second internal phase shifter, and split and output, by the fourth beam splitter, an optical signal outputted by the second internal phase shifter; and invoke a second interference optical path optical parameter calculation relational expression to determine a parameter of the second internal phase shifter, the second interference optical path optical parameter calculation relational expression being as follows:

$$\begin{cases} L'_3 = (r_4 e^{i\theta_R} r_3 - t_4 t_3) L_3 + (r_4 e^{i\theta_R} it_3 + it_4 r_3) L_4 \\ L'_4 = (it_4 e^{i\theta_R} r_3 + ir_4 t_3) L_3 + (r_4 r_3 - t_4 t_3 e^{i\theta_R}) L_4 \end{cases},$$

wherein, $L_3'$ is the final output optical information of the first input optical signal, $L_4'$ is the final output optical information of the second input optical signal, $L_3$ is the intermediate output optical information of the first input optical signal at the output port of the phase shifter, $L_4$ is the intermediate output optical information of the second input optical signal at the output port of the phase shifter, $r_3$ is a reflectance of the third beam splitter, $r_4$ is a reflectance of the fourth beam splitter, $t_3$ is an intermediate parameter and $t_3=\sqrt{1-r_3^2}$, $t_4$ is a second intermediate parameter and $t_4=\sqrt{1-r_4^2}$, i represents an imaginary number, e represents an exponent, and $\theta_R$ is the parameter of the second internal phase shifter.

14. The data processing apparatus based on an optical neural network according to claim 13, wherein the processor, upon execution of the computer program, is configured to:

the preset beam-splitting condition being 50:50, solve the second interference optical path optical parameter calculation relational expression to obtain a second parameter calculation relational expression; and determine the parameter of the second internal phase shifter according to the second parameter calculation relational expression, the second parameter calculation relational expression being as follows:

$$\cos\theta_R = \frac{(t_3 t_4)^2 + (r_3 r_4)^2 - 1/2}{2 r_3 r_4 t_3 t_4}.$$

15. The data processing apparatus based on an optical neural network according to claim 10, wherein the preset beam-splitting condition is 50:50, and the processor, upon execution of the computer program, is configured to:

determine whether the beam-splitting ratios of the beam splitters are within a range of 15:85 to 85:15.

16. A non-transitory computer-readable storage medium, storing a computer program executable by a processor, wherein upon execution by the processor, the computer program is configured to cause the processor to:

respectively acquire beam-splitting ratios of beam splitters of a first interference optical path structure and a second interference optical path structure; wherein an optical interference unit of an optical neural network comprises the first interference optical path structure, a phase shifter, and the second interference optical path structure, the first interference optical path structure and the second interference optical path structure each comprise an internal phase shifter and an optical shifter;

in response to the beam-splitting ratios of the beam splitters satisfying a beam-splitting compensation condition, respectively acquire initial optical information, intermediate input optical information at an input port of the phase shifter, intermediate output optical information at an output port of the phase shifter, and final output optical information of an input optical signal; and in response to the initial optical information and the intermediate input optical information as well as the intermediate output optical information and the final output optical information satisfying a preset beam-splitting condition of the optical neural network, calculate parameters of internal phase shifters of the first interference optical path structure and the second interference optical path structure, so as to perform data processing by using the optical neural network based on the parameters.

17. The non-transitory computer-readable storage medium, according to claim 16, wherein the input optical signal comprises a first input optical signal and a second input optical signal, and the processor, upon execution of the computer program, is configured to:

the first interference optical path structure comprising a first beam splitter, a first internal phase shifter, and a second beam splitter, input, by the first beam splitter, the input optical signal of the optical neural network into the first internal phase shifter, and input, by the second beam splitter, an optical signal outputted by the first internal phase shifter into the phase shifter; and invoke a first interference optical path optical parameter calculation relational expression to determine a parameter of the first internal phase shifter, the first interference optical path optical parameter calculation relational expression being as follows:

$$\begin{cases} L'_1 = (r_2 e^{i\theta_L} r_1 - t_2 t_1)L_1 + (r_2 e^{i\theta_L} it_1 + it_2 r_1)L_2 \\ L'_2 = (it_2 e^{i\theta_L} r_1 + ir_2 t_1)L_1 + (r_2 r_1 - t_2 t_1 e^{i\theta_L})L_2 \end{cases},$$

wherein, $L_1'$ is the intermediate input optical information of the first input optical signal of the optical neural network at the input port of the phase shifter, $L_2'$ is the intermediate input optical information of the second input optical signal of the optical neural network at the input port of the phase shifter, $L_1$ is the initial optical information of the first input optical signal, $L_2$ is the initial optical information of the second input optical signal, $r_1$ is a reflectance of the first beam splitter, $r_2$ is a reflectance of the second beam splitter, $t_1$ is an intermediate parameter and $t_1 = \sqrt{1-r_1^2}$, $t_2$ is a second intermediate parameter and $t_2 = \sqrt{1-r_2^2}$, i represents an imaginary number, e represents an exponent, and $\theta_L$ is the parameter of the first internal phase shifter.

18. The non-transitory computer-readable storage medium, according to claim 17, wherein the processor, upon execution of the computer program, is configured to:

the preset beam-splitting condition being 50:50, solve the first interference optical path optical parameter calculation relational expression to obtain a first parameter calculation relational expression; and determine the parameter of the first internal phase shifter according to the first parameter calculation relational expression, the first parameter calculation relational expression being as follows:

$$\cos\theta_L = \frac{(t_2 t_1)^2 + (r_2 r_1)^2 - 1/2}{2 r_2 t_1 t_2 r_1}.$$

19. The non-transitory computer-readable storage medium, according to claim 16, wherein the input optical signal comprises a first input optical signal and a second input optical signal, and the processor, upon execution of the computer program, is configured to:

the second interference optical path structure comprising a third beam splitter, a second internal phase shifter, and a fourth beam splitter, input, by the third beam splitter, an input optical signal of the phase shifter into the second internal phase shifter, and split and output, by the fourth beam splitter, an optical signal outputted by the second internal phase shifter; and invoke a second interference optical path optical parameter calculation relational expression to determine a parameter of the second internal phase shifter, the second interference optical path optical parameter calculation relational expression being as follows:

$$\begin{cases} L'_3 = (r_4 e^{i\theta_R} r_3 - t_4 t_3)L_3 + (r_4 e^{i\theta_R} it_3 + it_4 r_3)L_4 \\ L'_4 = (it_4 e^{i\theta_R} r_3 + ir_4 t_3)L_3 + (r_4 r_3 - t_4 t_3 e^{i\theta_R})L_4 \end{cases},$$

wherein, $L_3'$ is the final output optical information of the first input optical signal, $L_4'$ is the final output optical information of the second input optical signal, $L_3$ is the intermediate output optical information of the first input optical signal at the output port of the phase shifter, $L_4$ is the intermediate output optical information of the second input optical signal at the output port of the phase shifter, $r_3$ is a reflectance of the third beam splitter, $r_4$ is reflectance of the fourth beam splitter, $t_3$ is an intermediate parameter and $t_3 = \sqrt{1-r_3^2}$, $t_4$ is a second intermediate parameter and $t_4 = \sqrt{1-r_4^2}$, i represents an imaginary number, e represents an exponent, and $\theta_R$ is the parameter of the second internal phase shifter.

20. The non-transitory computer-readable storage medium, according to claim 19, wherein the processor, upon execution of the computer program, is configured to:

the preset beam-splitting condition being 50:50, solve the second interference optical path optical parameter calculation relational expression to obtain a second parameter calculation relational expression; and determine the parameter of the second internal phase shifter according to the second parameter calculation relational expression, the second parameter calculation relational expression being as follows:

$$\cos\theta_R = \frac{(t_3 t_4)^2 + (r_3 r_4)^2 - 1/2}{2 r_3 r_4 t_3 t_4}.$$

* * * * *